(12) United States Patent
Olson et al.

(10) Patent No.: US 8,085,359 B2
(45) Date of Patent: Dec. 27, 2011

(54) FOLDED BACKLIGHT SYSTEMS HAVING LOW INDEX REGIONS THAT PREVENT LIGHT FAILING TO MEET TOTAL INTERNAL REFLECTION CONDITIONS FROM ENTERING A PLATE PORTION AND LIQUID CRYSTAL DISPLAYS USING THE SAME

(75) Inventors: Scot Olson, Scottsdale, AZ (US); Brent D. Larson, Cave Creek, AZ (US)

(73) Assignee: Honeywell International Inc., Morristown, NJ (US)

( * ) Notice: Subject to any disclaimer, the term of this patent is extended or adjusted under 35 U.S.C. 154(b) by 92 days.

(21) Appl. No.: 12/104,235

(22) Filed: Apr. 16, 2008

(65) Prior Publication Data

US 2009/0262283 A1 Oct. 22, 2009

(51) Int. Cl.
*G02F 1/1335* (2006.01)
*G09F 13/04* (2006.01)
*F21V 7/04* (2006.01)

(52) U.S. Cl. .................. 349/65; 362/97.3; 362/628

(58) Field of Classification Search .............. 349/65, 349/60, 61, 62, 68, 149; 362/97.2, 97.3, 362/628
See application file for complete search history.

(56) References Cited

U.S. PATENT DOCUMENTS

| | | | |
|---|---|---|---|
| 5,808,708 A * | 9/1998 | Oyama et al. ............... 349/65 |
| 6,065,846 A | 5/2000 | Kato et al. | |
| 6,278,546 B1 * | 8/2001 | Dubin et al. ............... 359/452 |
| 6,523,966 B1 | 2/2003 | Satoh et al. | |
| 6,655,825 B2 | 12/2003 | Muthu et al. | |
| 6,742,907 B2 | 6/2004 | Funamoto et al. | |
| 7,056,001 B2 | 6/2006 | Chuang | |
| 7,168,841 B2 | 1/2007 | Hsieh et al. | |
| 7,188,988 B2 | 3/2007 | Koganezawa | |
| 7,193,248 B2 | 3/2007 | Weindorf et al. | |
| 7,229,198 B2 | 6/2007 | Sakai et al. | |
| 7,239,792 B2 | 7/2007 | Kim | |
| 7,252,399 B2 | 8/2007 | Ferri et al. | |
| 2005/0036203 A1 * | 2/2005 | Ferri et al. ............... 359/501 |
| 2005/0185113 A1 * | 8/2005 | Weindorf et al. ........... 349/71 |
| 2005/0231976 A1 * | 10/2005 | Keuper et al. .............. 362/600 |
| 2006/0126178 A1 * | 6/2006 | Li ............................ 359/485 |
| 2007/0008456 A1 * | 1/2007 | Lesage et al. ............... 349/62 |
| 2007/0052882 A1 * | 3/2007 | Hwang et al. ............... 349/62 |
| 2007/0274095 A1 * | 11/2007 | Destain ..................... 362/609 |

FOREIGN PATENT DOCUMENTS

JP 05093913 A * 4/1993

* cited by examiner

*Primary Examiner* — David Nelms
*Assistant Examiner* — Paul Lee
(74) *Attorney, Agent, or Firm* — Ingrassia Fisher & Lorenz, P.C.

(57) ABSTRACT

A liquid crystal display is provided. The liquid crystal display includes a liquid crystal display panel having pixels configured to form an image; and a backlight system proximate to the liquid crystal display panel and configured to illuminate the pixels of the liquid crystal display panel. The backlight system includes a light guide including a plate portion generally parallel to the liquid crystal display panel and a first side portion extending generally perpendicularly from the plate portion, a light source configured to emit light into the light guide via the first side portion, and a heat sink coupled to the light source and configured to remove heat generated by the light source during operation.

20 Claims, 4 Drawing Sheets

FOLDED BACKLIGHT SYSTEMS HAVING LOW INDEX REGIONS THAT PREVENT LIGHT FAILING TO MEET TOTAL INTERNAL REFLECTION CONDITIONS FROM ENTERING A PLATE PORTION AND LIQUID CRYSTAL DISPLAYS USING THE SAME

TECHNICAL FIELD

The present invention generally relates to a liquid crystal display having a backlight system, and particularly relates to a liquid crystal display with a folded backlight system.

BACKGROUND

Many efforts have been made to study and develop various types of display devices as substitutes for cathode ray tubes (CRTs), such as liquid crystal display devices (LCDs), plasma display panels (PDPs), electro-luminescence displays (ELDs), and vacuum fluorescent displays (VFDs). For example, LCDs have been actively developed as flat display panels in laptop computers, desktop computers, and large-sized information displays because of their high quality images, lightness, thinness, compact size, and low power consumption. Thus, the demand for LCDs increases continuously.

LCDs typically include an LCD panel on which images are formed and a backlight system for illuminating the images on the LCD panel. Generally, the backlight system includes one or more light sources and may include a light guide. When a light guide is present, the light sources are typically arranged adjacent to one or more edges of the light guide. The light guide receives and mixes the light from the light sources and directs the light to illuminate the LCD panel. The design and operation of backlight systems is a particularly important consideration. Some backlight systems may suffer from the following common disadvantages: uneven luminance and/or luminance spots; brightness issues; heat management issues; sizing constraints; and color mixing issues.

Accordingly, it is desirable to provide a more compact backlight system with a compact design that provides adequate color mixing, luminance characteristics, and heat management. In addition, it is desirable to provide improved LCDs with such a backlight system. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a liquid crystal display is provided. The liquid crystal display includes a liquid crystal display panel having pixels configured to form an image; and a backlight system proximate to the liquid crystal display panel and configured to illuminate the pixels of the liquid crystal display panel. The backlight system includes a light guide including a plate portion generally parallel to the liquid crystal display panel and a first side portion extending generally perpendicularly from the plate portion, a light source configured to emit light into the light guide via the first side portion, and a heat sink coupled to the light source and configured to remove heat generated by the light source during operation.

In accordance with another exemplary embodiment, a backlight system includes a light guide including a plate portion and a first side portion extending generally perpendicularly from the plate portion, a light source configured to emit light into the light guide via the first side portion, and a heat sink coupled to the light source and configured to remove heat generated by the light source.

In accordance with yet another exemplary embodiment, a liquid crystal display includes a liquid crystal display panel comprising pixels configured to form an image; and a backlight system proximate to the liquid crystal display panel and configured to illuminate the pixels of the liquid crystal display panel. The backlight system includes a light guide having a plate portion generally parallel to the liquid crystal display panel and having a perimeter with at least four sides, fold portions coupled to each of the at least four sides of the plate portion, and side portions coupled to each of the fold portions, and extending essentially perpendicular from the plate portion, the side portions and the plate portion forming a cavity, a light source configured to emit light into the light guide via the side portions, and a heat sink coupled to the light source and configured to remove heat generated by the light source during operation. The liquid crystal display further includes circuitry arranged within the cavity and configured to drive the liquid crystal display panel and the light source.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, liquid crystal displays are provided that include backlight systems with light guides. The backlight systems can be used in a wide variety of applications, including, but not limited to, vehicle lighting, search lights, task lights and projection systems. The display system can particularly be utilized in vehicle applications, such as an airplane cockpit, as well as other applications where viewing angles, space, thermal, and/or structural issues are of concern. In accordance with exemplary embodiments, the light guides of the backlight systems can include side portions that extend generally perpendicularly from a plate portion. The extended side portions allow placement of the light sources in a position for efficient heat removal. Additionally, the side portions can have a length sufficient for mixing light from colored light sources, and can create a cavity with the plate portion to accommodate circuitry. Fold portions can couple the side portions to the plate portions and provide additional optical advantages.

Figure 1:
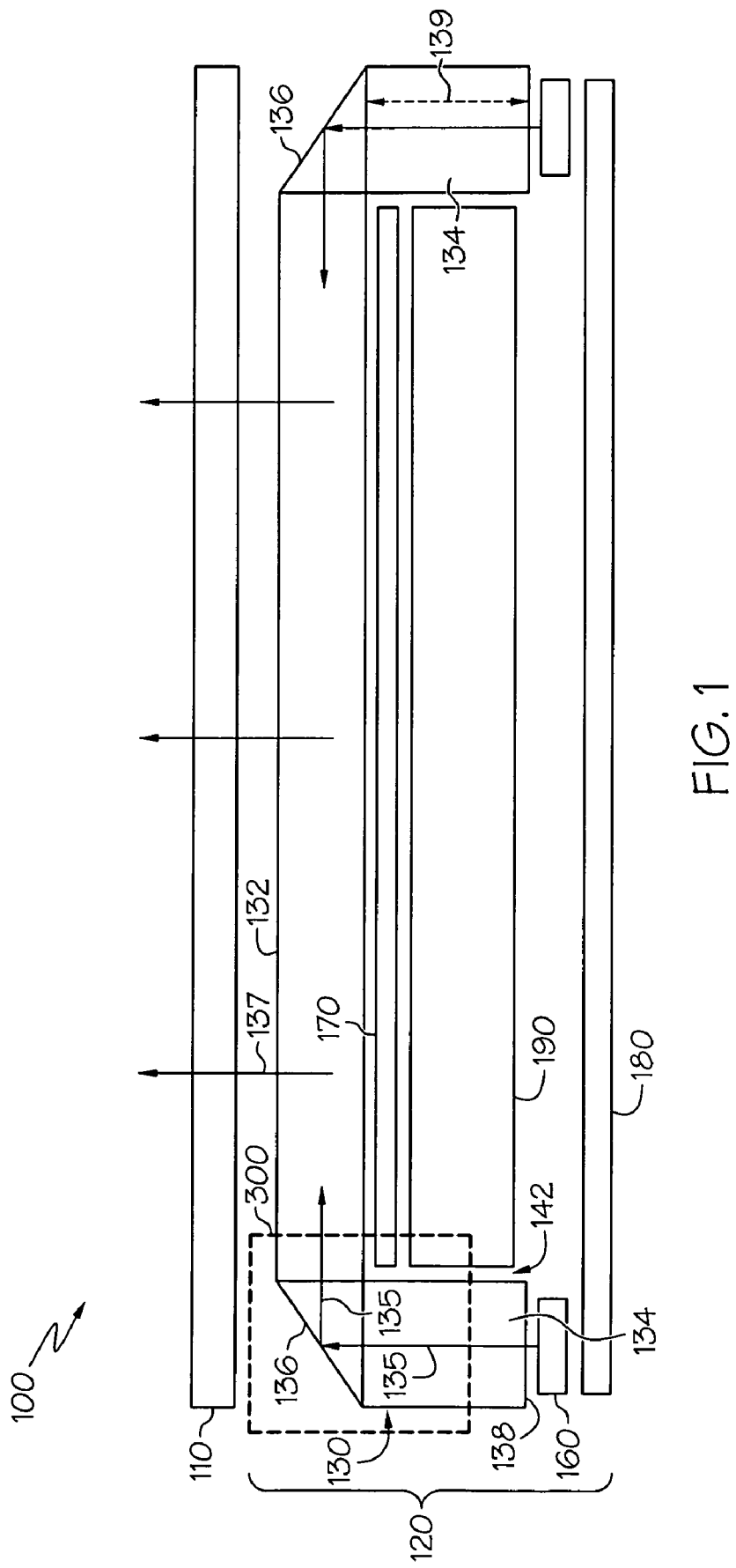
FIG. 1 is a cross-sectional view of a liquid crystal display (LCD) with a backlight system in accordance with an exemplary embodiment.

FIG. 1 is a cross-sectional view of a liquid crystal display (LCD) 100 in accordance with an exemplary embodiment.

Generally, the LCD 100 includes an LCD panel 110 and a backlight system 120 that illuminates the LCD panel 110, as will be discussed in greater detail below. The LCD panel 110 generally includes a liquid crystal layer sandwiched between two glass substrates and divided into pixels. Typically, thin film transistors (TFTs) are mounted on the glass substrates to switch the pixels "on" and "off" such that images are formed on the LCD panel 110. In addition to the depicted LCD panel 110 and backlight system 120, the LCD 100 can include one or more color filters, diffusion plates, and/or prism sheets.

Figure 2:
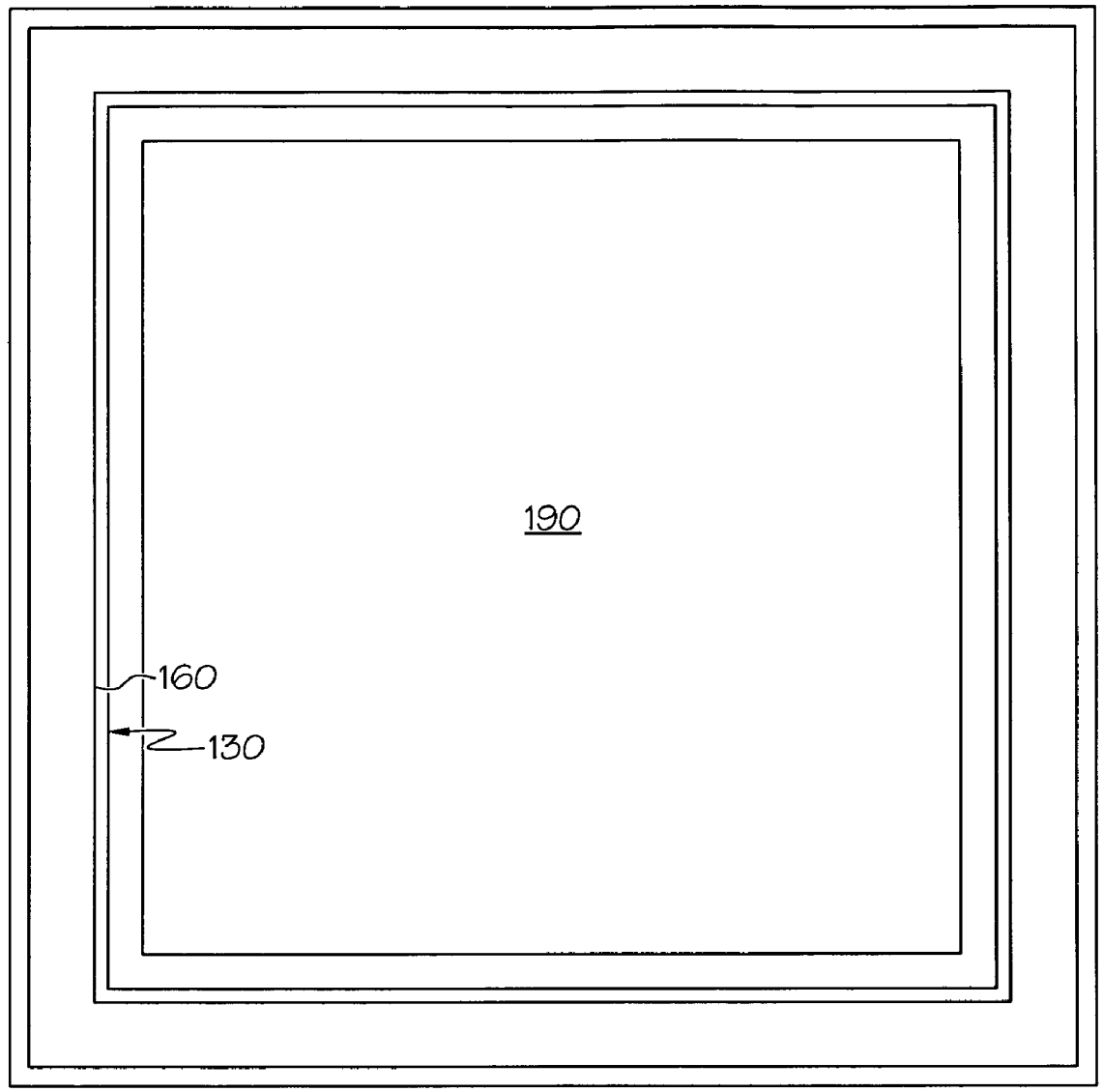
FIG. 2 is a partial, rear plan view of the backlight system of FIG. 1.

The backlight system 120 includes a light guide (or "waveguide") 130, a light source 160, a reflector 170, a heat sink 180, and circuitry 190. As discussed in further detail below, the light guide 130 directs light from the light source 160 to illuminate the LCD panel 110. FIG. 2 is a rear view of the LCD 100 with the heat sink 180 (FIG. 1) removed and will be discussed in conjunction with FIG. 1.

The light source 160 may include one or more light emitting diodes (LEDs). Typically, the LEDs include linear or planar arrays of red, green or blue LEDs, although white and other colors of LEDs are also possible. In other embodiments, the light source 160 can be one or more fluorescent lamps. As best shown in FIG. 2 and discussed in further detail below, the light source 160 typically extends around the perimeter of the backlight system 120, for example, around all four perimeter sides. Although the light source 160 is depicted as extending around all four perimeter sides of the backlight system 120, in alternate embodiments, the light source 160 may only be provided on one, two, or three of the sides of the backlight system 120.

In the depicted embodiment, the light guide 130 includes a plate portion 132 with a generally rectangular shape as viewed from the top and bottom sides, one or more side portions 134 extending from the perimeter of the plate portion 132, and one or more fold portions 136 that couple the side portions 134 to the plate portion 132. The plate portion 132 is formed into the shape of a substantially flat plate by a material having high transmissivity with respect to every range of relevant wavelength, for example, a transparent acrylic resin.

This arrangement, as best shown in FIG. 1, can be referred to as a "folded backlight" system since the side portions 134 extend at an angle to the plate portion 132. Consequently, by incorporating such a backlight system 120 into a display device, for example, the LCD 100, the outside dimensions of the display device with respect to the area of the data display space of the display device can be decreased. Namely, the display device can have smaller outside dimensions compared to a conventional display device having a data display space of the same area. This compact arrangement can be accomplished, while maintaining the luminance advantages of an edge-lit backlight system.

In the depicted embodiment, the side portions 134 are approximately 90° relative to the plate portion 132 and extend towards the light source 160. Again, as best shown in FIG. 2, the side portions 134 are provided on each of the perimeter sides of the backlight system 120 and generally correspond to the arrangement of the light source 160. The fold portions 136 and their relationship to the plate portion 132 and side portions 134 are discussed in further detail below.

The side portions 134 and the plate portion 132 of the light guide 130 form an interior cavity 142 that houses the circuitry 190. The circuitry 190 drives the backlight system 120 and/or the LCD panel 110. In many conventional LCDs, the circuitry is positioned behind the backlight system, thereby disadvantageously creating additional thickness. The length 139 of the side portions 134 can be adjusted as necessary to accommodate additional or less circuitry 190.

Generally, the plate portion 132, side portions 134, and fold portions 136 may be formed of a transparent polymer material such as acrylic or polycarbonate. Alternatively, glass, such as fused silica, F2, or BK7 can be used, as well as a combination of these materials.

The reflector 170 is positioned between the light guide 130 and the circuitry 190 within the cavity 142. The reflector 170 is preferably a reflective white sheet, but may also be diffusely or specularly reflective, and may contain any of several reflective materials or structures such as polymers, metals, metallic films, paints, fibers, structured glass or ceramics. The reflector 170 extends parallel to the plate portion 132 and to each of the side portions 134.

The heat sink 180 is positioned proximate to the light source 160 and functions to draw heat away from the light source 160. Generally, the heat sink 180 can be any suitable material, such as for example, aluminum, copper, other metals or certain crystalline structures. Composite materials may also be used, especially when the composite includes particles or components with high thermal conductivity properties. The folded nature of the light guide 130 enables a more efficient and effective use of the heat sink 180 and particularly enables heat to be removed at a distance from the LCD panel 110. This separation between the LCD panel and the combination of heat sink 180 and light sources 160, for example 0.25 to 0.5 inches or more, enhances thermal heat dissipation by allowing the heat sink surface area or cross-section to be larger and to operate at higher temperatures without adversely impacting the temperature and therefore the optical performance of the LCD panel 110. In addition, the isolation from the LCD panel 110 also makes it more practical for circuitry 190 to share the same heat sink 180.

Now that the structure of the LCD 100 has been introduced, the operation of the LCD 100 will be described. The light source 160, which in this example is driven by circuitry 190, emits ray 135, for example. Ray 135 enters the light guide 130 on a bottom face 138 of the side portion 134. Due to the perpendicular nature of the side portion 134, the optical coupling between the light guide 130 and the light source 160 can approximate an edge-lit back light, even though the light source 160 is positioned behind the light guide 130. Ray 135 passes from the side portion 134 into the fold portion 136, and then from the fold portion 136 into the plate portion 132. The light passing through the fold portion 136 is discussed in greater detail below in reference to FIG. 3. Ray 135 may pass directly out of the plate portion 132 as light 137 that illuminates the LCD panel 110, or may be totally internally reflected within the plate portion 132 until extracted as light 137. The plate portion 132 can include one or more extraction features (not shown) to assist in extracting the light. Any light that leaks out of the rear side of the plate portion 132 can be reflected back into the plate portion 132 by the reflector 170.

As noted above, the light source 160 typically includes multiple colors of LEDs. These colors may include red, green, blue and white LEDs and the light that enters the side portion 134 (e.g., ray 135) is typically separated into colors. The side portion 134 can have a length 139 sufficient to enable the colored light to mix such that a white light is formed prior to reaching the plate portion 132 and being emitted from the light guide 130. Generally, the longer the side portion 134, the more color mixing occurs. The provision of multiple colors of light source 160 allows the colors to mix as needed for achieving backlight or display output having the desired mixed color or chromaticity. In one embodiment, the length 139 of the side portions 134 can be "tuned" to produce the desired amount of color mixing. Additional color mixing may or may not occur in the plate portion 132.

Figure 3:
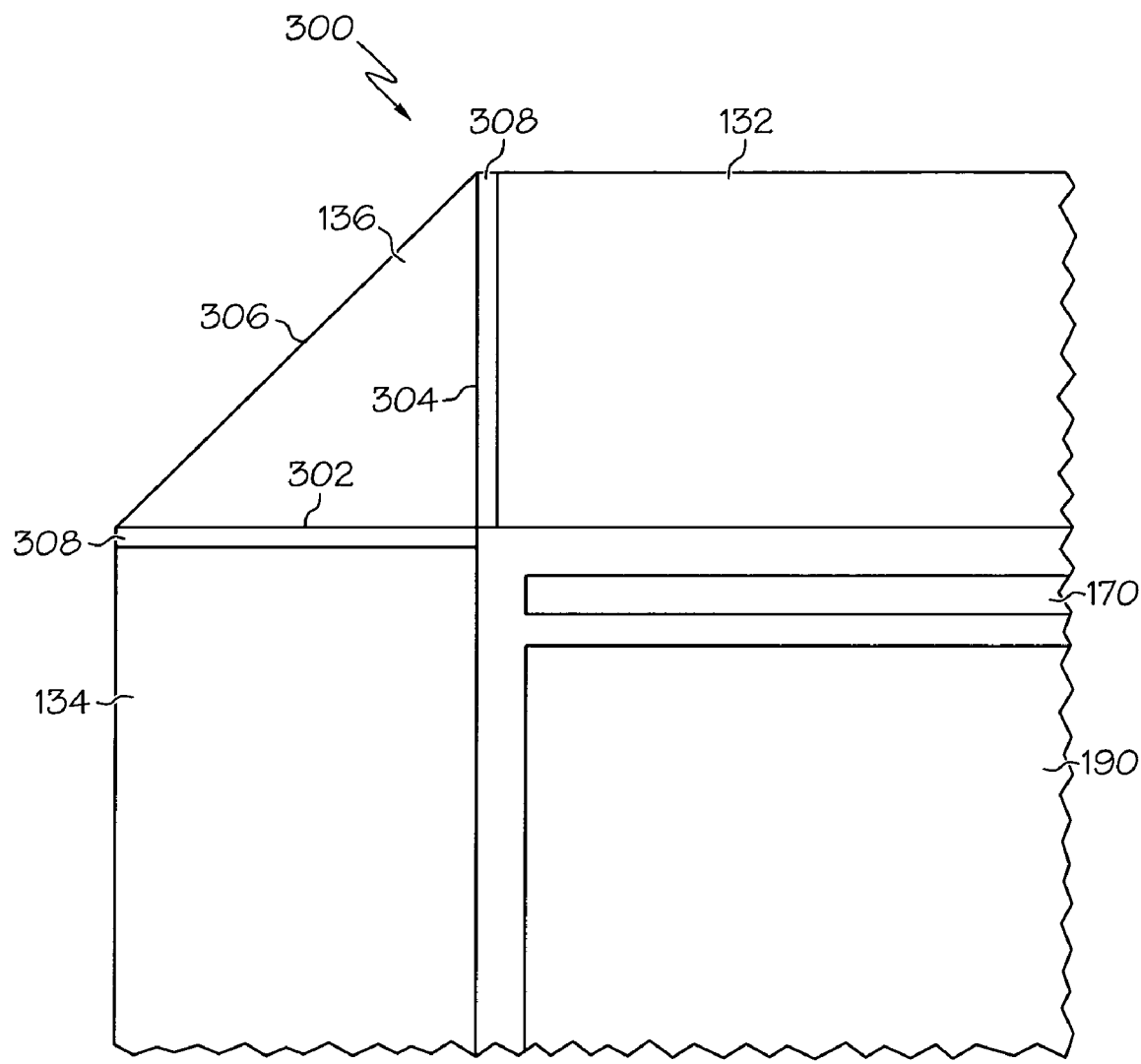
FIG. 3 is a close-up view of a portion of FIG. 1.

FIG. 3 is a close-up view of section 300 of FIG. 1 and particularly depicts the fold portion 136. In the depicted embodiment, the fold portion 136 has the cross-sectional shape of a right triangle with one leg 302 being coupled to the side portion 134 and one leg 304 being coupled to the plate portion 132. The fold portion 136 can be any suitable material, such as for example, polycarbonate. Similarly, the fold portion 136 can be the same or different material as the plate portion 132 and/or the side portion 134.

Generally, the legs 302, 304 of the cross-sectional shape of the fold portion 136 are the same lengths and correspond to the thicknesses of the side portions 134 and the plate portion 132, respectively. The outer side 306 (or third leg of the cross-sectional shape) can include a reflective material, for example a coating or an adjacent mirror, such that any light that would otherwise escape from the fold portion 136 is reflected back into the light guide 130 and is directed to the plate portion 132.

The fold portion 136 can be coupled to the plate portion 132 and the side portions 134 by low index regions 308. The low index regions 308 typically have a refractive index low enough to maintain total internal reflection (TIR) of the light propagated within the light guide 130. In one embodiment, the low index regions 308 can be formed by an adhesive that adheres the fold portion 136 to the plate portion 132 or the side portions 134. The adhesive can be, for example, a layer of adhesive or spots of adhesive with air gaps in between. In other embodiments, the low index region 308 can be formed by air, clear PTFE, silicone, or any suitable material. The presence of the low index region helps to minimize the loss of useful light at the fold region by preventing light from entering the plate portion 132 at angles which do not meet the conditions for TIR within plate portion 132.

Although the depicted light guide 130 is a multi-piece light guide, in an alternate embodiment, the light guide 130 can be a single piece. In other words, the light guide 130 can be physically folded to form the side portions 134 and fold portions 136, or the light guide 130 can be molded into the plate portion 132, side portions 134, and fold portions 136. Moreover, although the cross-sectional shape of the fold portions 136 in FIGS. 1 and 3 is triangular, the fold portions 136 can have other cross-sectional shapes, such as for example, semi-circular or trapezoidal. Even as a single piece, light guide 130 may still include low index regions 308. For example, air spaces may be provided by cutting, casting or otherwise shaping the single piece to include full or partial channels within the structure, and these air spaces may alternately filled with suitable index materials. In still further embodiments, the light source 160 can be positioned within the cavity 142, and light from the light source 160 can enter the light guide 130 on an inner side of side portion 134.

Figure 4:
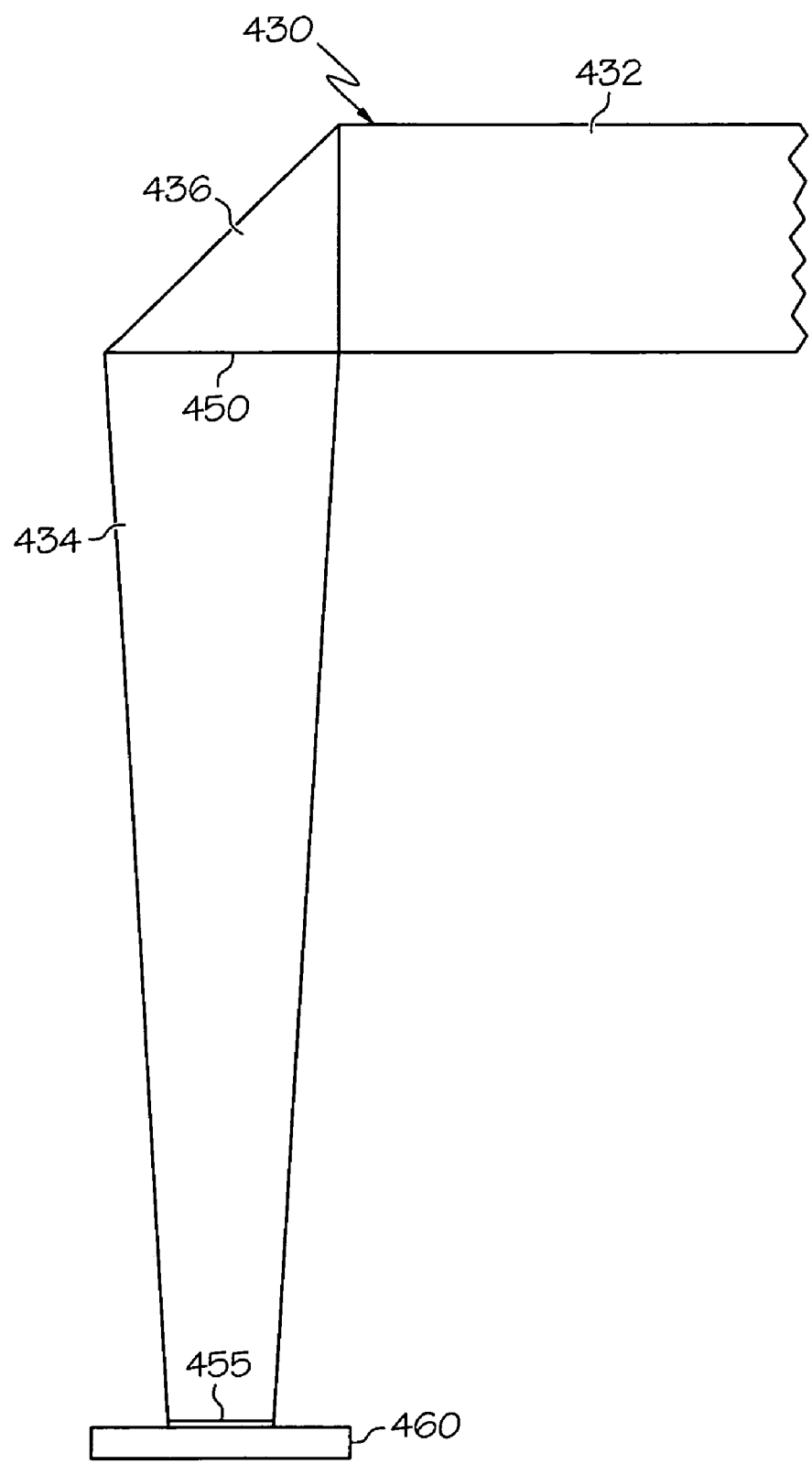
FIG. 4 is a partial cross-sectional view of a backlight system in accordance with an alternate exemplary embodiment.

FIG. 4 is a partial cross-sectional view of a backlight system 400 in accordance with an alternate exemplary embodiment. As in the embodiments described above, the backlight system 400 includes a light source 460 and a light guide 430. The light guide 430 includes a plate portion 432, one or more side portions 434, and one or more fold portions 436.

In this embodiment, the side portions 434 have tapered, rectangular cross-sections. In other words, the side portions 434 have a first end 450 coupled to the fold portion 436 and a second end 455 adjacent the light source 460. The first end 450 has a thickness or area greater than that of the second end 455. The tapered side portions 434 can function as collimators and/or compound parabolic concentrators, and can include tapering as shown in FIG. 4 or along the orthogonal axis. The introduction of angular tapering makes the optical output of the side portions 434 more collimated or directional.

Collimated light produced by the tapered side portions 434 can be preferable for optimizing the material selection and performance of the fold portion 436 and plate portion 432 of light guide 430. By reducing the angular spread of light which enters the fold portion 436, less light will escape from the fold region and the effectiveness of any low index region, if present, will be enhanced.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A liquid crystal display, comprising:
    a liquid crystal display panel comprising pixels configured to form an image; and
    a folded backlight system proximate to the liquid crystal display panel and configured to illuminate the pixels of the liquid crystal display panel, the folded backlight system comprising
        a light guide including a plate portion generally parallel to the liquid crystal display panel, a first side portion extending generally perpendicularly from the plate portion, a first fold portion coupling the first side portion to the plate portion, and a low index region coupling the first fold portion to the plate portion,
        the plate portion having first and second faces and the first side portion having a third face, wherein the first, second and third faces are generally parallel and non-coplanar with respect to one another,
        a light source configured to emit light into the light guide at the third face of the first side portion, and
        a heat sink coupled to the light source and configured to remove heat generated by the light source during operation, and
        wherein the low index region is configured to prevent light emitted by the light source from entering the plate portion at angles that fail to meet total internal reflection (TIR) conditions within the plate portion, and
        wherein the light source includes a first LED and a second LED, respectively configured to emit light of a first chromaticity and a second chromaticity, and wherein the first side portion mixes the light of the first chromaticity and light of the second chromaticity within the first side portion to produce light of a third chromaticity, and wherein the first side portion has a length sufficient to mix the light of the first chromaticity and the light of the second chromaticity such that the light of a third chromaticity is produced prior to reaching the plate portion.

2. The liquid crystal display of claim 1, wherein the first side portion and the plate portion form a cavity, and wherein the liquid crystal display further comprises circuitry arranged within the cavity and configured to drive the liquid crystal display panel and the light source, wherein the plate portion has a perimeter with at least four sides, the circuitry being arranged internal to the perimeter of the plate portion.

3. The liquid crystal display of claim 2, further comprising a reflector positioned between the circuitry and the light guide.

4. The liquid crystal display of claim 1, wherein the plate portion has a perimeter with at least four sides, the first side portion extending from the perimeter on a first side of the at least four sides.

5. The liquid crystal display of claim 4, wherein the backlight system further comprises second, third, and fourth side portions respectively extending from the second, third, and fourth sides of the at least four sides of the perimeter of the plate portion.

6. The liquid crystal display of claim 1, wherein the first side portion is tapered.

7. The liquid crystal display of claim 1, wherein the first side portion is a collimator having a first end coupled to the plate portion and a second end proximate to the light source, the first end having a thickness greater than the second end.

8. The liquid crystal display of claim 1, wherein the first fold portion has a triangular cross-sectional shape.

9. The liquid crystal display of claim 1, wherein the low index region is formed by an adhesive, the adhesive having a lower refraction index than the plate portion and first side portion.

10. The liquid crystal display of claim 9, wherein the adhesive is a spot adhesive such that air gaps are maintained between the first fold portion and at least one of the plate portion and the first side portion.

11. A backlight system, comprising:
a light guide including a plate portion, a first side portion extending generally perpendicularly from the plate portion, a first fold portion coupling the first side portion to the plate portion, a first low index region coupling the first fold portion to the plate portion, and a second low index region coupling the first fold portion to the first side portion,
a light source configured to emit light into the light guide via the first side portion, wherein the first and second low index regions are configured to prevent light emitted by the light source from entering the plate portion at angles that fail to meet total internal reflection (TIR) conditions within the plate portion, wherein the light source includes a red LED, a blue LED, and a green LED, respectively configured to emit red, blue, and green light, and wherein the first side portion mixes the red, green, and blue light within the first side portion to produce a white light, and wherein the first side portion has a length sufficient to mix the red, green, and blue light such that the white light is produced prior to reaching the plate portion, and
a heat sink coupled to the light source and configured to remove heat generated by the light source.

12. The backlight system of claim 11, wherein the plate portion has an outer perimeter, and wherein the first side portion and the plate portion form a cavity internal to the outer perimeter, and wherein the backlight system further comprises circuitry arranged within the cavity and configured to drive the light source.

13. The backlight system of claim 11, further comprising a reflector positioned between the circuitry and the light guide.

14. The backlight system of claim 11, wherein the plate portion has a perimeter with at least four sides, the first side portion extending from the perimeter on a first side of the at least four sides, and wherein the backlight system further comprises second, third, and fourth side portions respectively extending from the second, third, and fourth sides of the at least four sides of the perimeter of the plate portion.

15. The backlight system of claim 11, wherein the first side portion is a tapered collimator.

16. The backlight system of claim 11, wherein the first fold portion has a triangular cross-sectional shape, wherein the plate portion has first and second faces and the first side portion has a third face, wherein the first, second and third faces are generally parallel and noncoplanar with respect to one another, and wherein the first side portion, the first fold portion, and the plate portion are each generally transparent.

17. A liquid crystal display, comprising:
a liquid crystal display panel comprising pixels configured to form an image;
a backlight system proximate to the liquid crystal display panel and configured to illuminate the pixels of the liquid crystal display panel, the backlight system comprising
a light guide including
a plate portion generally parallel to the liquid crystal display panel and having a perimeter with at least four sides,
low index regions-coupled to at least two of the at least four sides of the plate portion,
bend portions coupled to the low index, and
side portions coupled to each of the bend portions, and extending essentially perpendicular from the plate portion, the side portions and the plate portion forming a cavity, wherein the side portions, the bend portions, and the plate portion are each generally transparent,
a light source configured to emit light into the light guide via the side portions, and wherein the low index regions are configured to prevent light emitted by the light source from entering the plate portion at angles that fail to meet total internal reflection (TIR) conditions within the plate portion, wherein the light source includes a red LED, a blue LED, and a green LED, respectively configured to emit red, blue, and green light, and wherein the first side portion mixes the red, green, and blue light within the first side portion to produce a white light, and wherein the first side portion has a length sufficient to mix the red, green, and blue light such that the white light is produced prior to reaching the plate portion, and
a heat sink coupled to the light source and configured to remove heat generated by the light source during operation; and
circuitry arranged within the cavity and configured to drive the liquid crystal display panel and the light source.

18. The liquid crystal display of claim 1, wherein the first LED, the second LED, and the light guide are arranged such that the light of the first chromaticity and the light of the second chromaticity enter the first side portion as separate chromaticities.

19. The liquid crystal display of claim 1, wherein the first side portion has a length and the third face of the first side portion has a width, and wherein the length of the first side portion is greater than the width of the third face.

20. The liquid crystal display of claim 1, wherein the first side portion has a length and the light source has a width, and wherein the length of the first side portion is greater than the width of the light source.

* * * * *